United States Patent [19]
Ono et al.

[11] Patent Number: 4,586,795

[45] Date of Patent: May 6, 1986

[54] WAVEGUIDE FOR LASER BEAMS

[75] Inventors: Kimizo Ono; Shinya Takenaka; Katsuyoshi Sunago, all of Osaka, Japan

[73] Assignee: Sumitomo Electric Industries, Ltd., Osaka, Japan

[21] Appl. No.: 654,049

[22] Filed: Sep. 24, 1984

Related U.S. Application Data

[63] Continuation of Ser. No. 381,654, May 24, 1982, abandoned.

[30] Foreign Application Priority Data

May 26, 1981 [JP] Japan ................................ 56-80593

[51] Int. Cl.[4] .............................................. G02B 17/06
[52] U.S. Cl. .................................... 350/620; 350/619; 219/121 LQ
[58] Field of Search ............... 350/294, 504, 505, 299, 350/620, 619; 219/121 LQ, 121 LW, 121 LR

[56] References Cited

U.S. PATENT DOCUMENTS

| | | | |
|---|---|---|---|
| 214,501 | 4/1879 | Fritsch et al. | 350/505 |
| 2,504,383 | 4/1950 | Bouwers et al. | 350/505 |
| 2,941,078 | 6/1960 | Montel | 350/294 |
| 3,112,355 | 11/1963 | Ross | 350/294 |
| 3,762,794 | 10/1973 | Arnaud | 350/294 |
| 3,950,079 | 4/1976 | Rambauske | 350/294 |
| 3,957,339 | 5/1976 | Engel | 350/294 |
| 3,965,327 | 6/1976 | Ehlscheid et al. | 219/121 LQ |
| 3,986,767 | 10/1976 | Rexer et al. | 219/121 LQ |
| 4,030,807 | 6/1977 | Briney | 350/6.9 |
| 4,117,319 | 9/1978 | White | 250/201 |
| 4,135,787 | 1/1979 | McLafferty | 350/294 |
| 4,192,573 | 3/1980 | Brown | 350/294 |
| 4,239,341 | 12/1980 | Cason et al. | 350/294 |
| 4,309,005 | 1/1982 | McLean | 244/3.16 |

FOREIGN PATENT DOCUMENTS 55097  6/1977  Japan ............................ 219/121 LQ

*Primary Examiner*—Jon W. Henry
*Attorney, Agent, or Firm*—Sughrue, Mion, Zinn, Macpeak & Seas

[57] ABSTRACT

A laser waveguide is developed which uses various combinations of convex and concave mirrors in conjugate pairs. The waveguide is made more effications by arranging the mirrors and selecting the reflective surfaces thereof so that the diametral increase of plurality of parallel light beams is checked, or the diameter reduced.

6 Claims, 17 Drawing Figures

WAVEGUIDE FOR LASER BEAMS

This is a continuation of application Ser. No. 381,654 filed May 24, 1982.

BACKGROUND OF THE INVENTION

This invention relates to a waveguide for laser beams for use in laser-utilizing devices such as laser-utilizing machine tools or laser-utilizing surgical knives.

Laser-utilizing machine tools for cutting, drilling, or fusion-welding metallic and other organic materials by the use of electromagnetic wave energy generated by the electrical excitation of gases such as helium, neon, or carbon dioxide, or a solid such as YAG, have acquired a very important position in the industrial field.

Some of the apparatus employing carbon dioxide lasers will be used in the field of the manufacture and processing of precision toothed wheels. Now in practical use is a $CO_2$ laser surgical knife, which is appreciated due to its capability of positionally accurate application to the diseased part and its instantaneous hemostatic effect.

This invention relates to a waveguide for light beams which uses spherical surface mirrors and permits arbitrary setting of laser beam diameter.

Usually, a waveguide for a laser beam is obtained by a combination of mirrors and optical lenses. For example, flat mirrors have so far been used in the waveguide for the laser surgical knife. Since laser beams are parallel to each other, the transmission of the beams without a change in the diameter of a plurality of parallel beams would seem to be possible by a combination of flat mirrors and the formation of a waveguide in a shape and size as desired. However, in practice, the diameter of a "bundle" of such laser beams gradually expands due to the angular expansion of the beam. In the case of a carbon dioxide laser, the diameter of a beam bundle may double with a 2 meter advance.

The use of concave mirrors serves to suppress the diametral expansion of the beam bundle. In Japanese Patent Laid-Open No. Sho 55-81644, a waveguide such as above is proposed. This waveguide is composed so as to guide laser beams to a desired position along a desired direction by a combination of concave surface mirrors instead of flat surface ones, and suppress the expansion of beam bundle. In the invention as proposed, however, no particular attention is paid to the relation between the mirror surface and the beam axis.

SUMMARY OF THE INVENTION

An object of this invention is to provide a waveguide for light beams capable of eliminating focal aberration in both the vertical and transverse directions by a combination of two conjugate spherical mirrors.

DETAILED DESCRIPTION OF THE PREFERRED EMBODIMENTS

When light falls or is reflected along the normal of a concave mirror, the focal length f is equal to a half of the radius of curvature R of the concave surface. A focal length, however, is not primarily determined for light falling along the beam axis inclined with respect to the normal passing through the center of the concave surface mirror. The focal lengths f are different from each other according to the direction, vertical or transverse, along the sectional plane of the light beam bundle.

If a laser beam bundle is cross-sectionally circular, it is deformed to be elliptical when reflected by the concave surface mirror, that is to say, an aberration appears.

Figure 1:
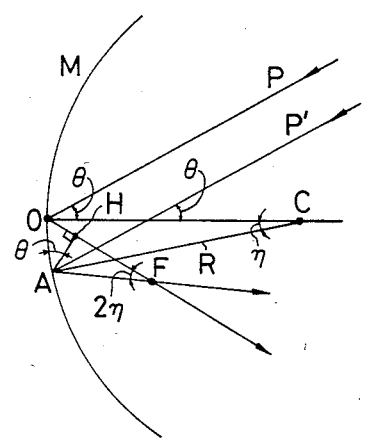
FIG. 1 is a geometric illustrative view illustrating the determination of focal length F when parallel light beams OP and AP′ travelling on a plane including a normal passing through the center of a concave surface mirror M whose radius of curvature is R fall on said mirror at an angle $\theta$.

FIG. 1 is an illustrative view showing how to determine the focal length when parallel light beams fall onto a concave surface mirror M whose radius of curvature is R at an incident angle $\theta$ with respect to the normal of the mirror.

The reference characters O and C indicate the center of the mirror and the center of the spherical surface, respectively.

The line OC is a normal passing through the center of the mirror surface. Incident light beams PO and P'A are parallel with each other and form an incident angle $\theta$ with respect to the normal OC. Reflected beams travel along lines OF and AF and meet each other at the focus F. A line OF indicates the focal length f.

A component of the beam lying in the plane including the center line OP of the beam and the normal OC passing through the center is hereby called a vertical component. Let us find the focal length fl of the vertical component. On the assumption that:

$$\angle OCA = \eta \quad (1)$$

where $\eta$ is a minute degree of angle, then:

$$\angle OFA = 2\eta \quad (2)$$

because the reflected beam forms a doubled deflection angle of the mirror surface. The foot of the perpendicular from the point A to the straight line OP is designated as H. Since $\eta$ is minute, $$OAH \approx \theta \quad (3)$$

and, therefore, $$OA \approx R\eta \quad (4)$$

and, further, $$AH = OA \cos \theta \quad (5)$$

$$2\theta f \approx AH \quad (6)$$

Then, the focal length fl of the vertical component is obtained as follows:

$$fl = \frac{R \cos \theta}{2} \quad (7)$$

It is understood that a focal length fl of a light beam falling at an incident angle $\theta$ is $\cos \theta$ times as large as the focal length $f_o$ (R/2) of a light beam passing near the mirror axis.

Figure 2:
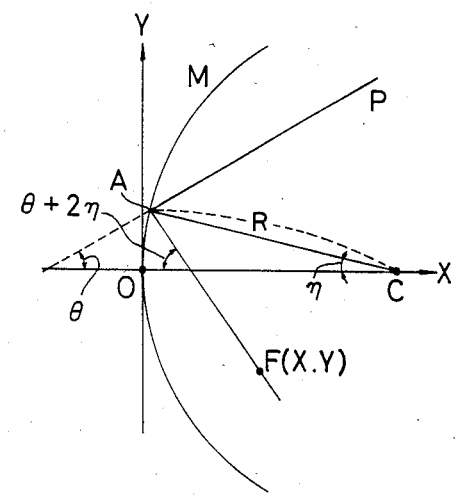
FIG. 2 is an illustrative view for analytically determining the same parameter as in FIG. 1 (vertical component)

The above verification is rather intuitive. A more strict verification is introduced with reference to FIG. 2.

The normal OC is assumed to be an abscissa X, and the direction perpendicular to the abscissa X in the plane including the beam axis and the normal is designated as the ordinate Y.

Assuming that a light beam falling at an incident angle $\theta$ with respect to the absicca X is reflected at a point A, a point (X, Y) is set on the reflected beam, and $\angle OCA = \eta$ in the same way as in Eq. (1), the inclination of the reflected beam is $\tan (\theta + 2\eta)$. Since the coordinate of the point A is:

$$\left( \frac{R\eta^2}{2}, R\eta \right)$$

an equation for the straight line AF is as follows:

$$Y - R\eta = -\{\tan (\theta + 2\eta)\} \left( X - \frac{R}{2} \eta^2 \right) \quad (8)$$

When the point (X,Y) is the focus F, a group of straight lines (Eq. (8)) whose parameter is $\eta$ all pass through the point F. Therefore, the position of a focus F is found by simultaneous equations including an equation obtained from partial differentiation of Eq. (8) and the assumption that $\eta = O$ and another equation obtained from the assumption $\eta = O$ in Eq. (8). From partial differentiation of Eq. (8) and the assumption that $\eta = O$, the following is obtained:

$$-R = -2(\sec^2 \theta)X \quad (9)$$

By assuming that $\eta = O$ in eq. (8), we obtain:

$$Y = -X \tan \theta \quad (10)$$

The focus is then found as follows:

$$X = \frac{R}{2} \cos^2 \theta \quad (11)$$

$$Y = -\frac{R}{2} \sin \theta \cos \theta \quad (12)$$

That is to say, the focus lies on the line forming an angle $\theta$ with respect to the normal OC and is distant by a length of fl from the mirror center O such that:

$$fl = R/2 \cos \theta \quad (13)$$

which is equal to the value obtained by Eq. (7) above.

Next, let us determine the focal length $f_t$ of the transverse component of the light beam.

Figure 3:
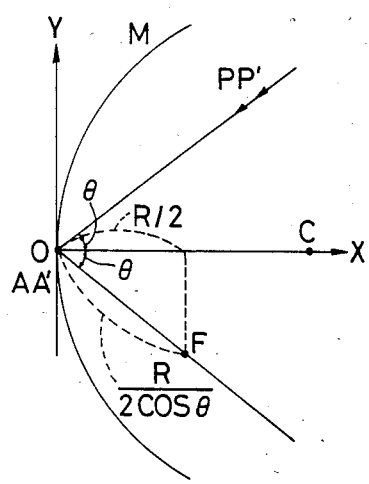
FIG. 3 is an illustrative view of light falling on a concave surface mirror M at an angle $\theta$, in which two beams of light are projected onto the ZY plane including a normal OC passing through the mirror center and a light beam OP passing through the mirror center O.
Figure 4:
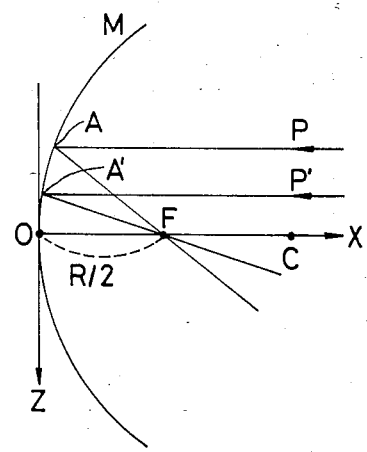
FIG. 4 is an illustrative view of two beams AP and A′P′ projected onto the ZX plane including the normal OC of the mirror and reflection points O, A, and A′, in which an apparent focal length on the projection drawings is equal to R/2.
Figure 5:
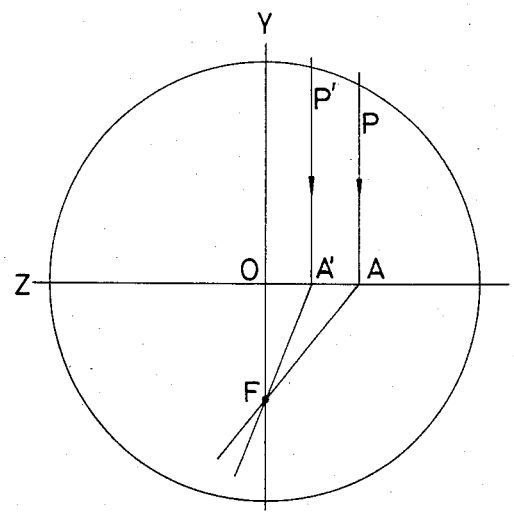
FIG. 5 is a projection drawing similar to FIG. 4 and viewed along the direction perpendicular to the mirror surface (XZ plane)

FIGS. 3, 4 and 5 are illustrative views of a concave surface mirror taken along an XY cross-sectional plane, a ZX plane, and the YZ plane, respectively. Light beams AP and A'P' deviating in the Z-direction (transverse component) are reflected at parts of the mirror surface (in the XZ plane) transversely deviating from the mirror center O and the focus lies on the line deviating from the normal OX at an angle $\theta$, and the quantity to be determined is the focus length $f_t$ (=OF).

FIG. 4 is a view showing incident and reflected light beams as projected in the ZX plane. This illustration is quite identical to that showing the usual proximate-to-axis light beams (passing near to and parallel with the normal) of the concave surface mirror having a radius R.

Therefore, a projection OF of the focal length must be equal to R/2 in length. However, since this is a projection on the ZX plane, the actual length can be found by multiplying the projecting length by the reciprocal of $\cos \theta$, that is:

$$f_t = \frac{R}{2 \cos \theta} \qquad (14)$$

Since this description is extremely intuitive, a more strict verification will be given.

In FIG. 4, as a view of the projections of the light beams, assuming $\angle ACO = \eta$(minute angle), a point (X,Z) on the reflected beam AF in the XZ plane lies on $$Z - \eta R = -(\tan 2\eta)X \qquad (15)$$

From FIG. 3, with respect to XY coordinates of the reflected beam, the following equation holds:

$$-Y = (\tan \theta)X \qquad (16)$$

The focus F can be found by solving simultaneous equations including an equation derived from the partial differentiation of Eq. (15) by $\eta$ and with the assumption that $\eta = O$, and another equation derived from Eq. (15) in which $\eta = O$ is assumed, because a bundle of straight lines satisfying Eq. (15) passes through the focus F. By differentiation of Eq. (15) and assuming $\eta = O$, we obtain:

$$-R = -2X \qquad (17)$$

By substituting the above equation (17) in equation (16):

$$Y = -\tfrac{1}{2}R \tan \theta \qquad (18)$$

Further, by assuming $\eta = O$ in Eq. (15):

$$Z = O \qquad (19)$$

That is, the focus F lies on:

(R/2, $-(R \tan \theta)/2$, O)

The focal length for the transverse component is:

$$f_t = \frac{R}{2 \cos \theta} \qquad (20)$$

Figure 6:
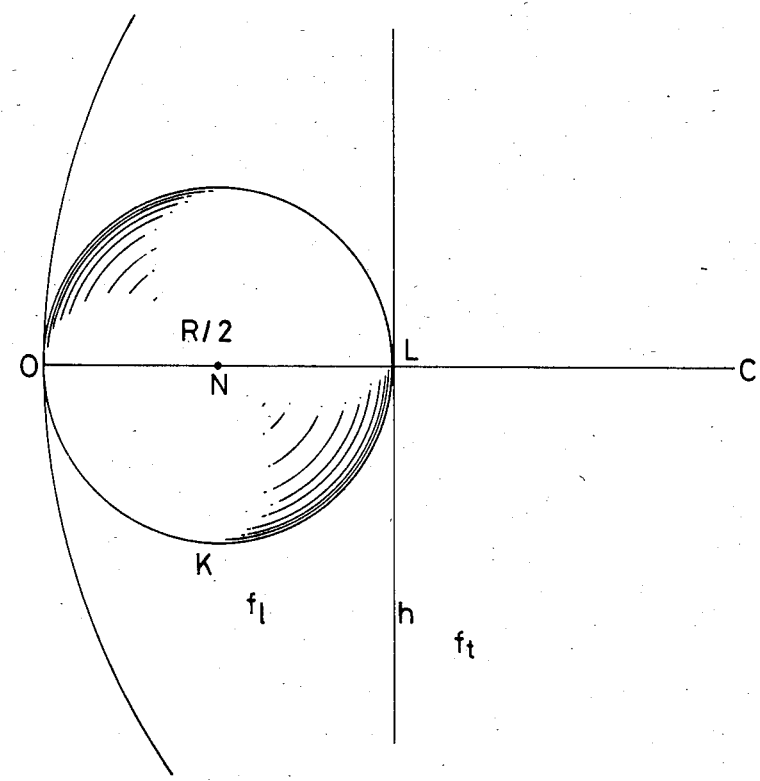
FIG. 6 is an illustrative view showing a locus k of focuses of vertical components of light beams falling on a concave surface mirror of radius R at an angle $\theta$, and a locus h of transverse components thereof, in which k forms a spherical surface touching the mirror center O, and has a diameter equal to R/2 Z and h forms the perpendicular bisecting surface of the center of the mirror O and the center of the spherical surface C.

FIG. 6 shows a locus k of focuses of vertical components, and that h of focuses of tranverse components of the light beam falling onto the center O of a concave mirror having a radius R, at an angle with respect to the normal OC.

The locus k of focuses of vertical components is in contact with the center of the mirror and in the form of a spherical surface whose radius is R/4 (the center N lies at a point such that ON =R/4). This is found from the fact that the equation for the circle $$\left(X - \frac{R}{4}\right)^2 + Y^2 = \left(\frac{R}{4}\right)^2 \qquad (21)$$

holds for the XY plane (the beam axis lies on the plane represented as Z=O). By applying this fact expansively to the planes Z≠O, it should be noted that the mirror surface is symmetrical with respect to the YZ plane (spheroidally symmetric). That is, the locus k of focuses in the vertical direction is given by $$\left(X - \frac{R}{4}\right)^2 + Y^2 + Z^2 = \left(\frac{R}{4}\right)^2 \qquad (22)$$

Contrary to this, the locus h of focuses in the transverse direction lies in the plane X =R/2 as induced from Eq. (17), that is, a perpendicular bisecting surface of the segment OC.

The vertical focal length $f_l$ is always smaller than the transverse one $f_t$ except in the case where $\theta = O$. Both lengths are in stereo-projection relation in which the spherical surface is projected on the plane.

When the incident direction deviates from $\theta = O$, separation of focal lengths invariably occurs. When mirrors are used in the waveguide for the light beams, it is rare that the direction of incidence agrees with $\theta = O$, and, therefore, the separation of focal lengths always occurs with the use of spherical surface mirrors in the waveguide. Even if the bundle of light beams is cross-sectionally circular, it is always deformed into an ellipse when reflected by the spherical mirror. When light beams are repeatedly reflected by spherical mirrors, the cross-sectional shape of the beam bundle becomes complex and can be narrowed no further.

It can be considered that, since the separation of focal lengths occurs in both directions with one spherical mirror, the additional use of another spherical mirror enables re-unification of the focal lengths.

Provided that focal lengths in both vertical and transverse directions differ from each other when one concave mirror is used, it is presumable that the additional use of another concave mirror disposed so that the directions of light beams are reversed vertically and transversely to those in the first mirror, namely, disposed in a skew position, enables the formation of a common focus F behind this additional mirror.

Equations (7), (13), (14), and (20) for the focal length hold for a convex surfaced mirror in the same way as for a concave one, however, R is a negative number.

The concave mirror and the convex one are different in nature from each other. Therefore, aberration related to the focus produced in the concave mirror is considered to be capable of being compensated by the use of a convex mirror. In this case, it is presumed unnecessary to disposed both mirrors in positions skew to each other.

We apply the term "conjugate" to such performance as forms a common focus regardless of the direction of the components for parallel light beams by an appropriate combination of two spherical mirrors as described above.

Figure 7:
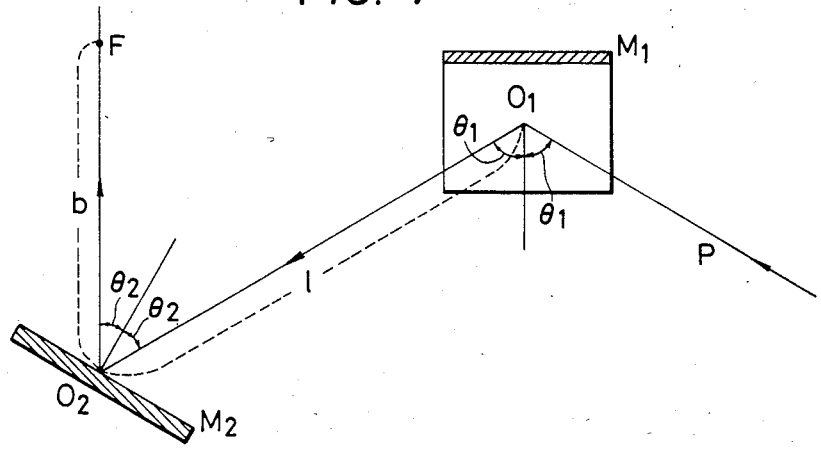
FIG. 7 is an illustrative view showing two concave mirrors $M_1$ and $M_2$ disposed askew with each other at an interval l, in which light beams fall and are reflected at angles $\theta_1$ and $\theta_2$, respectively, so as to form a vertically and transversely common focus F at a distance b behind the mirror $M_2$.

FIG. 7 shows an arrangement in which mirrors $M_1$ and $M_2$ are disposed in skew positions at an interval l so that a light beam P is reflected by the first mirror $M_1$ and then by $M_2$ and a single focus F is set at a point apart by a distance b from the mirror $M_2$.

When the positions of the images in the front and the rear of the mirrors are expressed as a and b, respectively, as well as the focus by f, a well-known equation holds as follows:

$$\frac{1}{a} + \frac{1}{b} = \frac{1}{f} \tag{23}$$

The bundle of light beams P is a bundle of laser beams and, therefore, a bundle of parallel beams ($a \to \infty$). The vertical components of the light beams and the transverse components thereof form images at positions distant by amounts $fl_1$ and $f_{t1}$ from the mirror $M_1$ respectively. These images fall on the mirror $M_2$ so that a = $-(fl_1 - l)$, $-(f_{t1} - l)$. The formation of a single image at a point F ($O_2F = b$), that is, the mirrors $M_1$ and $M_2$ will be conjugate, only if the following equations hold:

$$\frac{1}{fl_2} = -\frac{1}{fl_1 - l} + \frac{1}{b} \tag{24}$$

$$\frac{1}{ft_2} = -\frac{1}{fl_1 - l} + \frac{1}{b} \tag{25}$$

The above equation (24) indicates that beams as transverse components whose focus is formed at a position distant from the mirror $M_1$ fall on the mirror $M_2$ as vertical components and are focused at a point closer to the mirror surface to form an image at a point b.

By letting the radii of curvatures of the mirrors $M_1$ and $M_2$ be $R_1$ and $R_2$; the angles of incidence be $\theta_1$ and $\theta_2$, respectively, and by substituting equations (13) and (20) for (24) and (25), respectively, the following equations are obtained:

$$\frac{1}{R_2 \cos \theta_2} + \frac{\cos \theta_1}{R_1 - 2l \cos \theta_1} = \frac{1}{2b} \tag{26}$$

$$\frac{\cos \theta_2}{R_2} + \frac{1}{R_1 \cos \theta_1 - 2l} = \frac{1}{2b} \tag{27}$$

By eliminating $R_2$ above, the following is obtained:

$$R_1^2 - 2(l\alpha + b\beta)R_1 + 4l(l+b) = 0 \tag{28}$$

where, $$\alpha = \frac{1 + \cos^2 \theta_1}{\cos \theta_1} \tag{29}$$

$$\beta = (1 + \sin^2 \theta_1 \cot^2 \theta_2) \sec \theta_1 \tag{30}$$

the discriminant D is given as follows:

$$D = (l\beta + b\beta)^2 - 4l(l+b) \tag{31}$$

Solutions for $R_1$ and $R_2$ are given as follows:

$$R_1 = (l\alpha + b\beta) \pm \sqrt{D} \tag{32}$$

$$R_2 = 2b \left( \frac{-2l}{R_1} + \beta \right) \cot \theta_1 \, \text{cosec} \, \theta_1 \tan \theta_2 \sin \theta_2 \tag{33}$$

For a non-skew arrangement in which mirrors are disposed so that the normals thereof lies on the same plane including the light beam axis ($L_w$), equations in $R_1$ and $R_2$ are as follows: (conditions for the conjugate condition):

$$\frac{\cos \theta_2}{R_2} + \frac{\cos \theta_1}{R_1 - 2l \cos \theta_1} = \frac{1}{2b} \tag{34}$$

$$\frac{1}{R_2 \cos \theta_2} + \frac{1}{R_1 \cos \theta_1 - 2l} = \frac{1}{2b} \tag{35}$$

An equation for $R_1$ can be expressed as follows:

$$R_1^2 - 2(l\alpha + b\gamma)R_1 + 4l(l+b) = 0 \tag{36}$$

where, $$\gamma = (1 - \sin^2 \theta_1 \, \text{cosec}^2 \, \theta_2) \tag{37}$$

The discriminant D is as follows:

$$D = (l\alpha + b\gamma)^2 - 4l(l+b) \tag{38}$$

Solutions for $R_1$ and $R_2$ are:

$$R_1 = (l\alpha + b\gamma) \pm \sqrt{D} \tag{39}$$

$$R_2 = 2b \left( \frac{2l}{R_1} - \gamma \right) \cot \theta_1 \, \text{cosec} \, \theta_1 \tan \theta_2 \sin \theta_2 \tag{40}$$

There are a pair of solutions for each of $R_1$ and $R_2$. A solution large in absolute value and another small in value are expressed by the designation of positive (+) and negative (−) signs, respectively.

Figure 8:
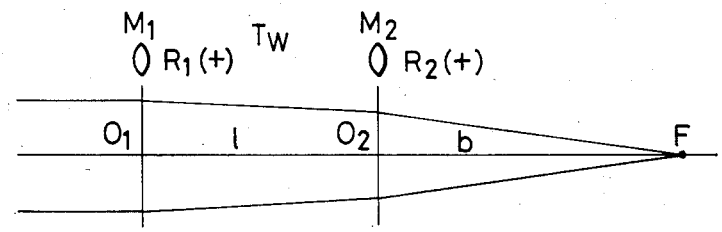
FIG. 8 is a view of light beams, in which is shown a solution $R_1(+)$ for a larger radius of curvature $R_1$ when a common focus F is formed at a distance b behind two concave mirrors arranged in skew positions and at an interval l.
Figure 9:
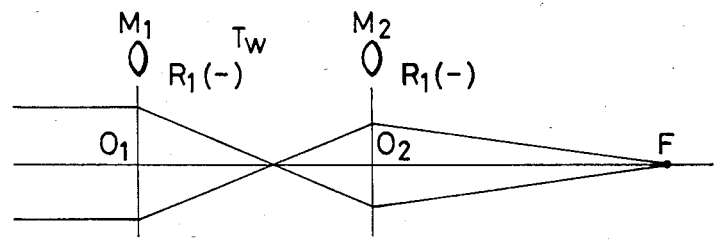
FIG. 9 is a view of light beams, in which is shown a solution $R_1(-)$ for a smaller radius of curvature $R_1$ under the same conditions as in FIG. 8.

FIGS. 8 and 9 are illustrative views of light beams corresponding to $R_1(+)$ and $R_2(+)$ and to $R_1(-)$ and $R_2(-)$ in the concave mirror, respectively.

In these drawings, the mirror is indicated by a vertical line for simplicity, and the reflected beam is also indicated by a straight line for avoiding difficulties in drawing the actual reflected beams. Symbols appearing as convex and concave lenses indicate concave and convex mirrors, respectively. Reference characters $T_w$ and $L_w$ indicate an arrangement in which both mirrors are disposed in skew positions and one in which normals of both mirrors lie on the same plane, respectively.

Figure 10:
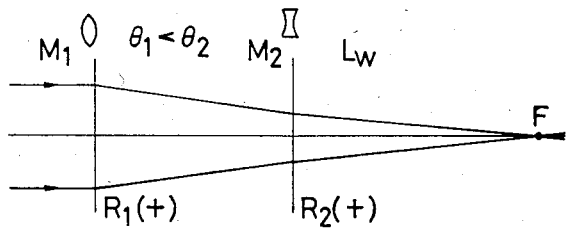
FIG. 10 is an illustrative view of light beams, in which a concave mirror $M_1$ and a convex one $M_2$ are arranged so that the normals passing through the centers of these mirrors are laid in the same plane, and a solution $R_1(+)$ for a larger radius of curvature $R_1$ is shown when a common focus F is formed.
Figure 11:
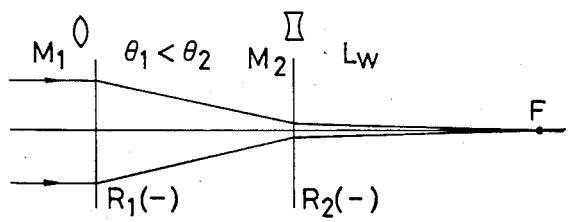
FIG. 11 is an illustrative view of light beams, in which is shown a solution $R_1(-)$ for a smaller radius of curvature $R_1$ under the same condition as in FIG. 10.

FIGS. 10 and 11 are schematic views of light beams when a concave mirror $M_1$ and a convex one $M_2$ are disposed in the $L_w$ arrangement. A common focus F is formed behind the mirror $M_2$. FIG. 10 corresponds to the solution (equations (34) and (35)) whose absolute value is large under the condition $\theta_1 < \theta_2$.

FIG. 11 corresponds to the solution whose absolute value is small under the same conditions as above.

Figure 12:
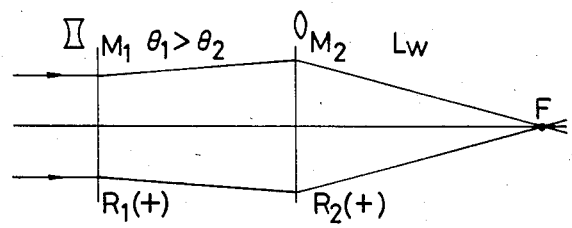
FIG. 12 is an illustrative view of light beams, in which a convex mirror $M_1$ and a concave one $M_2$ are arranged so that the normals passing through the centers of these mirrors are laid in the same plane, and a solution $R_1(+)$ for the radius of curvature $R_1$ having a large absolute value is shown when a common focus F is formed behind the mirror $M_2$.
Figure 13:
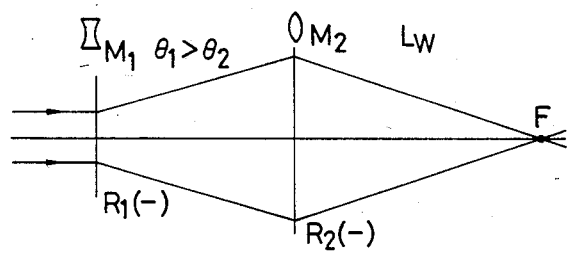
FIG. 13 is an illustrative view of light beams, in which is shown a solutiion $R_1(-)$ of smaller absolute value under the same conditions as in FIG. 12.

FIGS. 12 and 13 are schematic views of light beams and mirror positions in which a convex mirror $M_1$ and a concave one $M_2$ are in $L_w$ arrangement, a common focus F being formed behind the mirror $M_2$ under the condition $\theta_1 > \theta_2$.

FIGS. 12 and 13 correspond to the solutions of larger and smaller absolute value, respectively.

From the above description, it has become apparent that the separation of focuses in the vertical and transverse components may be eliminated by a combination of two spherical surface mirrors, that is, the parallel beams can be collected at a common focus. In this way, the light beam system can be diametrally enlarged or narrowed at any arbitrary rate. For this purpose, a combination of the mirrors $M_1$ and $M_2$ as well as a mirror group $M_3$ and $M_4$ are used.

The mirrors are arranged so that the rear focus of the mirror system of $M_1$ and $M_2$ is in agreement with the front focus of the mirror system of $M_3$ and $M_4$; and, further, the mirror $M_2$, the common focus $F_o$, and the mirror $M_3$ are all aligned, whereby the parallel beams are narrowed at the focus and then made parallel again.

The initial diameter $B_1$ and the final one $B_2$ can be set at any arbitrary ratio.

Figure 14:
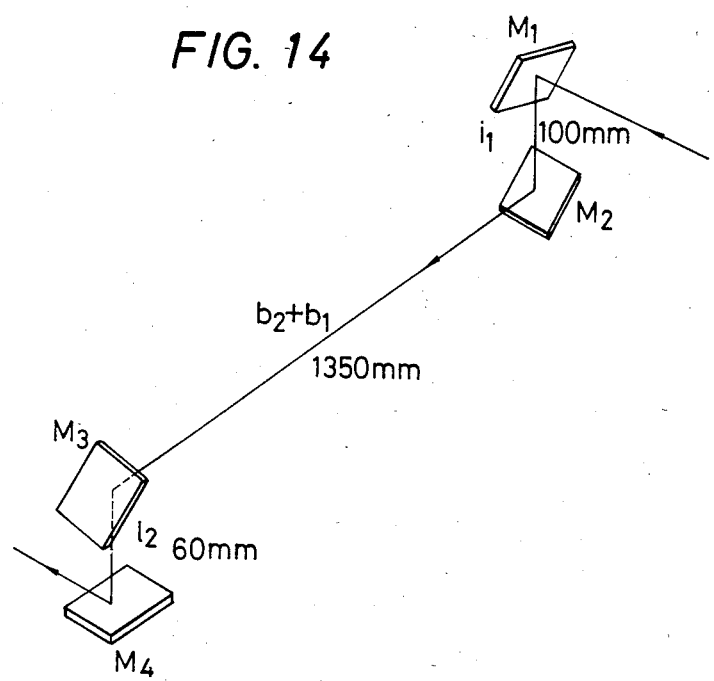
FIG. 14 is an illustrative view of an example, in which distances between two conjugate mirrors $M_1$ and $M_2$, between $M_3$ and $M_4$, and between $M_2$ and $M_3$ are 100, 60, and 1,350 mm, respectively, and incident parallel beams falling on the mirror $M_1$ are reflected by the mirror $M_4$ after being transformed into another type of parallel beam.

Let us consider an example of an arrangement including mirrors $M_1$ through $M_4$, as shown in FIG. 14. When the distances between $M_1$ and $M_2$, between $M_3$ and $M_4$, and between $M_2$ and $M_3$ are assumed to be 100 mm ($= l_1$), 60 mm ($= l_2$), and 1350 mm ($b_1 + b_2$), respectively, and mirrors $M_1$ and $M_2$ as well as $M_3$ and $M_4$ are disposed askew with respect to each other, the following relation is established for reducing the diameter of the light beam by half:
$b_1 = 900$ mm,
$b_2 = 450$ mm
Assuming that:
$l_1/b_1 = 0.111$, $l_2/b_2 = 0.133$, $\theta_1 = \theta_2 = 45°$
we obtained:

$$\alpha_1 = \beta_1 = \frac{3}{2}\sqrt{2} = 2.121$$

From Eqs. (31) and (32);
$R_1(+) = 4,150$ mm
(The solution for $R_1(-) = 96$ mm is discarded.)

From Eq. (33),
$R_2(+) = 3,730$ mm
Further, on the assumption that $\theta_3 = \theta_4 = 45°$, with respect to $M_3$ and $M_4$, from Eqs. (31) and (32),
$R_4(+) = 2,100$ mm
and from Eq. (33),
$R_3(+) = 1,860$ mm
Thus, the bundle of parallel laser beams can diametrally changed to any size by the use of two pairs of conjugate mirrors.

In the above example, the mirrors $M_3$ and $M_4$ are concave and disposed askew, but may be replaced by convex ones. In the latter case, the focus of $M_1$ and $M_2$ lies farther than the mirrors $M_3$ and $M_4$. That is to say, a point externally dividing the segment between $M_2$ and $M_3$ at a ratio of 2:1 is the focus of the mirror system of $M_1$ and $M_2$. The mirrors $M_3$ and $M_4$ have an imaginary focus, where the radii of curvatures $R_3$ and $R_4$ (both are negative real numbers) can be calculated from Eqs. (31) and (32), paying attention to the fact that b is negative.

Furthermore, when the outer mirrors $M_1$ and $M_4$ are provided as flat mirrors, $M_2$ as a concave mirror, and $M_3$ as convex, and these mirrors are arranged so that the beam axis as well as normals of the mirrors $M_2$ and $M_3$ lie in the same plane, the light beam can be narrowed by action of only the two mirrors $M_2$ and $M_3$. This is considered as the limit as (b→∞) and (1/b →O) in Eqs. (34) through (40). The following relations hold in this case:

$$R_1 \rightarrow \frac{2l}{\gamma} \tag{41}$$

$$R_2 \rightarrow -\frac{2l}{\gamma} \sin\theta_1 \tan\theta_1 \cot\theta_2 \csc\theta_2 \tag{42}$$

This arrangement cannot be obtained when $\gamma = 0$, i.e., $\theta_1 = \theta_2$. It is necessary that $\theta_1$ be different from $\theta_2$. This arrangement does not form completely parallel beams, but is sufficient for practical use.

In conclusion, for reducing the diameter of a bundle of parallel beams by the use of mirrors $M_1 - M_4$, the following combinations are available (Table 1).

The term "Equivalent optical lens system" means that the indicated arrangement of mirrors corresponds to an arrangement of convex and concave lenses appropriately combined in the order shown.

TABLE 1

Combination of spherical mirrors for reduction of light beam bundle diameter

| | Spherical Surface/Mirror | | | | Equivalent Optical | |
|---|---|---|---|---|---|---|
| | $M_1$ | $M_2$ | $M_3$ | $M_4$ | Lens | System |
| 1 | convex | × concave | convex | × convex | concave | + concave |
| 2 | convex | × convex | concave | × concave | concave | + convex |
| 3 | convex | = concave | concave | = convex | concave | + concave |
| 4 | convex | = concave | convex | = concave | concave | + convex |
| 5 | convex | = concave | concave | = convex | concave | + convex |
| 6 | convex | = concave | convex | = concave | concave | + convex |
| 7 | convex | × convex | convex | = concave | concave | + concave |

TABLE 1-continued

| | Combination of spherical mirrors for reduction of light beam bundle diameter | | | | | |
|---|---|---|---|---|---|---|
| | Spherical Surface/Mirror | | | | Equivalent Optical | |
| | $M_1$ | $M_2$ | $M_3$ | $M_4$ | Lens | System |
| 19 | flat | = ◠ | = | ◡ | flat | ◡ + ◠ |

Figure 15:
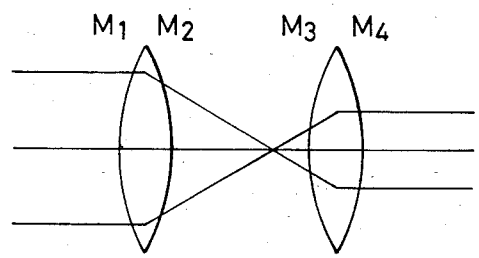
FIG. 15 is a view of light beams, in which a pair of conjugate mirrors $M_1$ and $M_2$ and another pair $M_3$ and $M_4$ are deemed as an optical system equivalent to convex or concave lenses, and the transformation of a system of parallel light beams into another type of parallel beams is proved to be possible.
Figure 16:
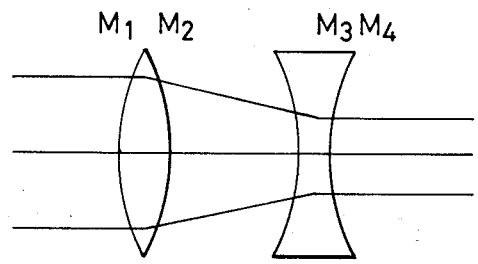
FIG. 16 is a view of light beams for proving that the same result as in FIG. 15 can be obtained by a combination of a convex lens and a concave one; and, FIG. 17 is a schematic view of a surgical laser knife, in which the concept of the present invention is utilized in the mirrors $M_1$, $M_2$, $M_3$, and $M_4$.

Legends: ◡
and ◠ : convex, concave mirrors
X on dividing line: mirrors disposed askew
= : normals of mirrors lie in the same plane For reducing the diameter of a bundle of beams, either a combination of a convex with a concave lens (FIG. 16) or a convex-concave pair (FIG. 15) is used in consideration of equivalent optical lens system.

Those combinations which are equivalent to the convex lens are three in kind as follows:

(1) Two concave mirrors disposed askew ($T_w$)
(2) A concave mirror + a convex mirror, in which the normals and beam axes thereof lie in the same plane ($L_w$).
(3) A convex mirror + a concave mirror, in which the normals and beam axes lie in the same plane ($L_w$)

Mirror arrangement patterns equivalent to the concave lens are also three in kind.

Therefore, the number of mirror arrangement equivalent to (convex + concave) lenses are (3×3=9), and those equivalent to (convex + concave) lenses are (3×3=9), as well. In total, therefore, eighteen (18) arrangement patterns are available.

The 19th arrangement, as shown in Table 1, corresponds to Eqs. (41) and (42), which is not capable or re-producing strictly parallel beams, but is nonetheless practical.

Calculations for the first example in Table 1, with respect to the arrangement shown in FIG. 14 has been presented above. Calculations for the second example, i.e., a concave-concave-convex-convex arrangement, will be presented. In this case, since a focus is formed at a point externally divided by the term ($b_1 + b_2$), the following results are obtained:

$b_1 = 2,700$ mm
$b_2 = 1,350$ mm where:
$\theta_1 = \theta_2 = 45°$ (assumed)
$l_1/b_1 = 0.037$
$l_2/b_2 = 0.0444$
From Eqs. (31), (32), and (33);
$R_1 = 11,780$ mm
$R_2 = 11,360$ mm
Correspondingly to the above are obtained:
$R_3 = -5,790$ mm
$R_4 = -5,530$ mm In the third example, i e., the concave-convex-convex-concave arrangement, in Table 1, the diameter of the beam bundle is reduced by half by setting the lengths $b_1 = 900$ mm and $b_2 = 450$ mm. For example, if $\theta_1 = 30°$, $\theta_2 = 60°$, $\theta_3 = 60°$, and $\theta_4 = 30°$, then, from Eqs. (39) and (40):

$R_1 = 1,530$ mm
$R_2 = -5,980$ mm
$R_3 = -2,880$ mm
$R_4 = 780$ mm

This indicates an arrangement in which $R_1$ and $R_2$ as well as $R_3$ and $R_4$ are out of skew positions and the mirrors are arranged so that the normals passing through the mirror centers lie in the same plane.

Let us perform a calculation for the fourth example, i.e., a concave-convex-concave-convex arrangement. The assumptions are partly the same as in the previous case: $b_1 = 900$ mm, $b_2 = 450$ mm, $\theta_1 = 30°$, and $\theta_2 = 60°$. The dimensions $R_1 = 1,530$ mm and $R_2 = -5,980$ mm are equal to those in the previous case. On the new assumption that $\theta_3 = 30°$, and $\theta_4 = 6.0°$:

$R_3 = 740$ mm
$R_4 = -3,320$ mm

Calculation for the fifth example, i.e., a concave-convex-convex-concave arrangement (according to the Equivalent optical lens system convex + concave) is given as follows:

For reducing the diameter of the beam bundle by half, it is required that $b_1 = 2,700$ mm, $b_2 = -1,350$ mm, $l_1/b_1 = 0.037$, and $l_2/b_2 = -0.0444$.

For example, on the assumption that $\theta_1 = 30°$, $\theta_2 = 60°$, $\theta_3 = 30°$, and $\theta_4 = 60°$, from Eqs. (39) and (40):

$R_1 = 4,300$ mm
$R_2 = -20,300$ mm
$R_3 = -2,080$ mm
$R_4 = 11,130$ mm

The radii of curvatures of the mirrors $M_1$ through $M_4$ can be calculated for all of 18 patterns of combinations on the same conditions ($l_1 = 100$ mm, $l_2 = 60$ mm, $b_1 + b_2 = 1,350$ mm, and the diameter of beam bundle being halved). In other words, all patterns of combination in the table are practicable.

Values of $l_1$, $b_1 + b_2$, and $l_2$ can be arbitrarily set, and no limitation is given to the ratio of the diameter of the beam bundle.

Figure 17:
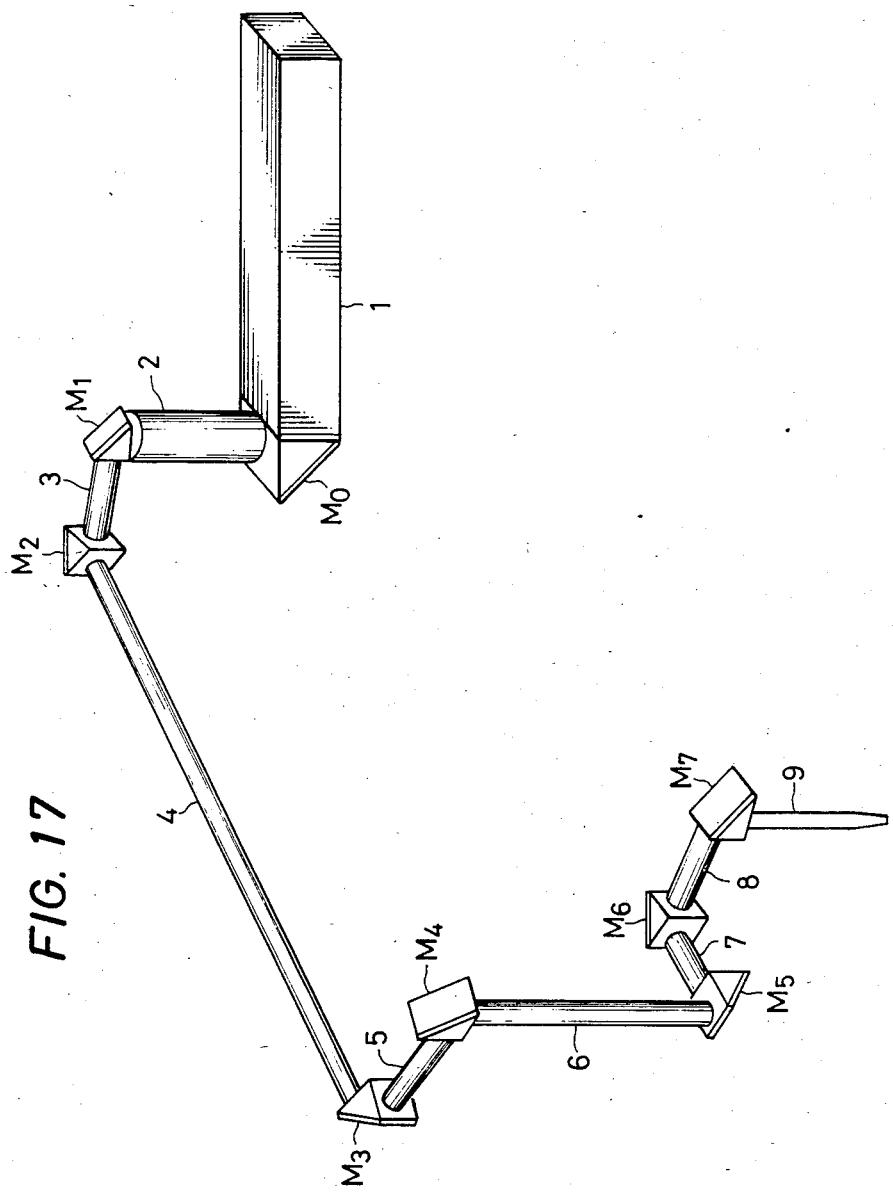

The waveguide for light beams according to the present invention is applicable to a variety of apparatus using laser beams. FIG. 17 is a schematic structural view of a surgical laser knife to which the present invention is applied. In this structure, beams from a carbon dioxide laser 1 are guided toward the tip of a handpiece 9 by means of a multi-joint reflection system. Mirrors $M_0$ through $M_7$ as used conventionally were all flat.

According to the present invention, conjugate mirrors $M_1$ and $M_2$, as well as $M_3$ and $M_4$, are used so as to reduce the diameter of a bundle of parallel laser beams without deforming the parallelism thereof. Mirrors $M_0$, $M_5$, $M_6$ and $M_7$ may be flat. The mirrors $M_1$ and $M_2$ are disposed in skew arrangement and are concave at the surface thereof, whereas $M_3$ and $M_4$ are also disposed askew, but in a set of concave or convex pairs (corresponding to the first and second examples, respectively, in Table 1).

The pipes 2 through 8 are connected to the mirrors $M_1$ through $M_6$ so that adjacent pipes are perpendicular to each other. Since angles of reflection are all adapted to be 45°, the pipes are disposed so as to be perpendicular.

In so far as depending on flat mirrors, it is impossible to suppress the diametral increase of a bundle of carbon dioxide laser beams, since these beams angularly expand, but the use of conjugate mirrors as practiced in this invention easily enables a narrowing of the diameter of the beam bundle. As a result, in the laser surgical knife as shown in FIG. 17, the hand-piece is easily made slender for improvement in operability.

The present invention is applicable not only to the change of the diameter of a parallel beam bundle, but also to the formation of a non-parallel beam bundle of small diameter by a combination of spherical mirrors capable of forming a common focus.

The number of mirrors used for formation of one common focus is not always two but may be three or more.

In general, when n mirrors $M_1, M_2, \ldots M_n$ are arranged at intervals $l_1, l_2, \ldots l_{n-1}$, respectively, the following will be true on the assumption that the radii of curvatures of mirrors are $R_1, R_2, \ldots R_n$, respectively.

An image-formation point of the vertical light component reflected by the mirror $M_i$ is indicated by $k_i$ and a point of the transverse light component by $h_i$, when a measurement of the length from the mirror center and along the direction of travel of the light is performed.

When the i-th mirror and the (i+1)-th one are disposed in $L_w$ arrangement, that is, with normals passing through mirror centers lying in the same plane, the following equations hold:

(1) $L_w$ $$\frac{1}{l_i - k_i} + \frac{1}{k_{i+1}} = \frac{2}{R_{i+1} \cos \theta_{i+1}} \quad (43)$$

$$\frac{1}{l_i - h_i} + \frac{1}{h_{i+1}} = \frac{2 \cos \theta_{i+1}}{R_{i+1}} \quad (44)$$

and, in the case of a $T_w$ arrangement in which the i-th mirror and the (i+1)-th one are disposed askew, the following equations hold:

(2) $T_w$ $$\frac{1}{l_i - k_i} + \frac{1}{h_{i+1}} = \frac{2 \cos \theta_{i+1}}{R_{i+1}} \quad (45)$$

$$\frac{1}{l_i - h_i} + \frac{1}{k_{i+1}} = \frac{2}{R_{i+1} \cos \theta_{i+1}} \quad (46)$$

These equations provide recurrence formulae with respect to $i = 2, \ldots n-1$.
For $i = 1$, the following relations hold:

$$\frac{1}{h_1} = \frac{2 \cos \theta_1}{R_1} \quad (47)$$

$$\frac{1}{k_1} = \frac{2}{R_1 \cos \theta_1} \quad (48)$$

For $i = n$, on the assumption that a common focus lies at the point b behind the mirror $M_n$, modifications of equations (45) and (46) hold, in which $h_{i+1}$ and $k_{i+1}$ in (45) and (46) are to be read as $h_n = k_n = b$.

Even after 2n sets of equations are generated, the arrangement ($L_w$ or $T_w$) between mirrors $M_i$ and $M_{i+1}$ is determined, the intervals $l_1, l_2, \ldots l_{n-1}$ are given, and the angles of incidence are set, a number of unknowns still remain:

(1) $R_1, R_2, \ldots R_n$
(2) $k_i, k_2, \ldots k_{n-1}$
(3) $h_1, h_2, \ldots h_{n-1}$ The number of unknowns is $(3n-2)$ and that of the equations is $2n$.

Therefore, $(n-2)$ degrees of freedom remain; whereby the design of the mirrors is made easier since values for $R_1, R_2, \ldots, R_n$ which are easy to design, can be given to some extent.

Since the degree of freedom is zero in the case where the number of mirrors is two as previously described, $R_1$ and $R_2$ could be found, but, when the number of mirrors is increased, the radii of curvatures can be freely set.

What is claimed is:

1. A waveguide for parallel light beams, comprising; a combination of at least one concave surface mirror and a convex surface mirror arranged in skew relation (Lw), said mirrors being formed such that parallel beams of light falling on said mirrors at given incident angles are reflected from one mirror to the other so that a common focus (F) is formed without an intermediate focus between said mirrors.

2. A waveguide for parallel light beams, comprising; a combination of at least a convex mirror and a concave mirror, said mirrors being arranged in skew relationship, and being formed such that parallel beams of light falling on said mirrors at given incident angles are reflected from one mirror to the other so that a common focus (F) is formed without an intermediate focus between said mirrors.

3. A waveguide as claimed in claims 1 or 2, wherein said mirrors comprise spherical reflecting surfaces.

4. A waveguide for light beams, comprising; a combination of at least two mirrors of spherical curvature arranged such that incident light falling at an angle other than 0° with respect to a normal through center of both of said mirrors is reflected from one mirror to the other wherein a common focus exists between said combination of mirrors, and at least two planar mirrors arranged on respective sides of said two spherically curved mirrors, and a further combination of at least one convex and one concave mirror arranged such that a beam axis and normals passing through centers of said mirrors lie in a plane, wherein a common focus of one said combination of mirrors is in agreement with a common focus of said further combination of mirrors, whereby a parallel light beam may be obtained.

5. A waveguide for light beams, comprising; a combination of mirrors having at least one concave surface mirror and a convex surface mirror F arranged in skew relation (Lw), said mirrors being formed such that beams of light falling on said mirrors at given incident angles are reflected from one mirror to the other so that a common focus (F) is formed without an intermediate focus between said combination of mirrors, and a further combination of at least one convex and one concave mirror arranged such that a beam axis and normals passing through centers of said mirrors lie in a plane, wherein a common focus on one said combination of mirrors is in agreement with a common focus of said further combination of mirrors, whereby a parallel light beam may be obtained.

6. A waveguide for light beams, comprising; a combination of mirrors having at least a convex mirror and a concave mirror, said mirrors being arranged in a skew relationship, and being formed such that beams of light falling on said mirrors at given incident angles are reflected from one mirror to the other so that a common focus (F) is formed without an intermediate focus between said combination of mirrors, and a further combination of at least one convex and one concave mirror arranged such that a beam axis and normals passing through centers of said mirrors lie in a plane, wherein a common focus of one said combination of mirrors is in agreement with a common focus of said further combination of mirrors, whereby a parallel light beam may be obtained.

7. A waveguide as claimed in claims 5 or 6, wherein said mirrors comprise spherical reflecting surfaces.

8. A waveguide as claimed in claims 10 or 11, wherein a common focus of one said combination of mirrors is in agreement with a common focus of said further combination of mirrors, whereby a parallel light beam may be obtained.

* * * * *